United States Patent [19]

Held

[11] Patent Number: 4,573,404
[45] Date of Patent: Mar. 4, 1986

[54] CONTINUOUS-ACTING PRESS WITH MULTI-LAYERED PRESS BANDS

[76] Inventor: Kurt Held, Alte Str. 1, D-7218 Trossingen 2, Fed. Rep. of Germany

[21] Appl. No.: 604,127

[22] Filed: Apr. 26, 1984

[30] Foreign Application Priority Data

Apr. 28, 1983 [DE] Fed. Rep. of Germany ....... 3315367

[51] Int. Cl.$^4$ .............................................. B30B 5/06
[52] U.S. Cl. .................................. 100/151; 100/154; 100/93 RP; 425/371; 156/583.5
[58] Field of Search ................... 100/93 RP, 151, 152, 100/153, 154, 118, 119, 120; 425/371; 156/583.5

[56] References Cited

U.S. PATENT DOCUMENTS 3,487,143 12/1969 Bergvall ......................... 425/371 X

FOREIGN PATENT DOCUMENTS 2735142 2/1979 Fed. Rep. of Germany ...... 425/371

*Primary Examiner*—Peter Feldman
*Attorney, Agent, or Firm*—Toren, McGeady, Stanger, Goldberg & Kiel

[57] ABSTRACT

A continuous-acting press, such as used in press laminates, chipboards, fiberboards, plywood, electrical laminates and the like into a continuous web, is made up of an upper and a lower multi-layered band set. Each band set passes over a pair of return rollers and includes a plurality of mutually contacting press bands. Lateral displacement of the press bands in the multi-layered band sets is prevented since alternating grooves and lands are formed in the contacting surfaces of the press bands so that the lands and grooves interengage. The grooves and lands are continuous in the travel direction of the band sets. To close the reaction zone formed by the space between the upper and lower band set, a wire travels along each of the opposite sides of the space at the same speed as the material being pressed and each wire seats in a pair of grooves formed in the mutually facing surfaces of the upper and lower multi-layered band sets. Accordingly, the space is closed and optimum process conditions for the material being pressed can be maintained.

8 Claims, 3 Drawing Figures

CONTINUOUS-ACTING PRESS WITH MULTI-LAYERED PRESS BANDS

BACKGROUND OF THE INVENTION

The invention is directed to a continuous-acting press formed by multi-layered press bands with each press band running over a pair of return rollers. Each of the band sets is formed of a plurality of mutually contacting press bands with the upper and lower band sets being spaced apart and having mutually facing surfaces forming a space for receiving a material web to be pressed.

To produce decorative laminate materials, chipboards, fiberboards, plywood boards, electrical laminates and the like, it is necessary to subject the material to high pressure and a high temperature so that the resin becomes completely cured and the products are of the required quality. It is, therefore, necessary for the press being used to be capable of exerting the required pressure and of transmitting the necessary heat.

Continuous and intermittent presses are used for the production of the above-mentioned materials. To increase the output of the intermittent-acting single-daylight presses, multi-daylight presses are used, where the material is piled in layers on individual platform sheets and the latter are then placed each into a daylight of the multi-daylight press. During the subsequent pressing of the material, it is necessary for the temperature and pressure cycles of the press to take into consideration the outermost press sets, whereby at the edges approximately 40 to 50 mm of the material cures without the application of pressure and has to be trimmed off afterwards, representing a waste of 5 to 10%. Furthermore, an intermittent-acting press can be integrated into a continuously operating production installation only with a great outlay for apparatus. Therefore, a continuous-acting press is also desirable, whereby the finished product is obtained in a continuous sheet or board, which is also desirable from the standpoint of low waste.

In such continuous-acting presses, two continuous steel bands, which transmit the operating pressure and the amount of heat to the material necessary to cure the resin and simultaneously draw the material through the press, are passed each over a drive drum and a return drum so that a reaction zone is formed between the mutually facing band surfaces. Customarily, pressure is transmitted mechanically by rollers rolling on the press bands or hydraulically by means of chambers filled with fluid pressure media and sealed from the exterior. The steel band must not exceed a certain thickness in view of the admissible flexural stresses of the continuous bands which occur during the deviation. However, the pressure which can be transmitted to the material is limited by the tensile strength and thickness of the steel band, which greatly restricts the capacity of the continuous press, and renders its use for the production of technical laminates, such as electrical laminates, difficult.

Because the pressure to be transmitted is directly proportional to the thickness of the steel band, it is known to pile a plurality of bands one upon another to form a set (see German Offenlegungsschrift 1,939,784) to increase the thickness while simultaneously maintaining the flexural strength, and to transmit the increased pressure through such a multi-layered band set. In this way the possibility of increasing the pressure as much as required for the material is advantageously created. The thermal capacity is thereby simultaneously increased in proportion to the sum of the individual thicknesses of all the bands, when the process heat is transmitted to the bands outside the reaction zone and fed into the reaction zone stored in the bands.

It is, however, a disadvantage in the use of a multi-layered band set that during the operation of the press the individual press bands can wander laterally relative to one another. It is, therefore, proposed in German Pat. No. 2,735,142 that the individual press bands of a multi-layered band set exhibit, in mutually contacting band surfaces, grooves in which centering means are inserted or fastened. However, it is to be considered a disadvantage in this case that the misaligning forces at right angles to the travel direction of the multi-layered band set act upon two centering means of small cross-section inserted along the band edge on the left and right, and that there is, therefore, a possibility of these centering means being destroyed at high pressures.

The reaction zone formed by the two opposite multi-layered band sets is closed upwardly and downwardly by the multi-layered band set, forwardly in the travel direction of the material web by cured resin and rearwardly by unmolten resin. However, it is open along the sides, with the result that surplus resin can escape laterally. The laminate, therefore, becomes cured, without the application of pressure in the marginal region and the required thickness tolerance cannot be realized at that location, so this so-called press edge has to be cut off after the laminate is completed.

SUMMARY OF THE INVENTION

The primary object of the present invention is to produce a continuous-acting double band press so that it is possible to produce laminates of extraordinarily close thickness tolerances down to 5/100 mm by isochoric operation, while lateral wandering or displacement of the bands of multi-layered construction, and lateral escape of the material, must be prevented to reduce waste of the area trimmed off at the edge.

In accordance with the present invention the contacting surfaces of the individual press bands forming the multi-layered band sets are provided with alternating lands and grooves so that the contacting surfaces inter-engage one another. In addition, a wire is provided in grooves extending along each of the opposite sides of the space between the upper and lower band sets limiting the space containing the materials being pressed.

The advantages which can be achieved by the invention are that the individual press bands of the multi-layered band set can no longer wander laterally relative to one another. Due to the particular conformation of the alternating lands and grooves, which can be distributed across the total band width, the press bands have a large cross-sectional area, and, therefore, cannot be destroyed by the misaligning forces acting, so the multi-layered band set is protected reliably from any lateral displacement of the individual press bands under all operating conditions admissible for the press band material itself. Due to the particular shape of the grooves and lands, high precision in the centering of the individual press bands, and consequently high straight guidance precision, is achieved.

Furthermore, due to the entrainment of the wire along the lateral edges of the multi-layered band sets, a reaction zone closed on all sides is obtained, whereby an ideal temperature cycle for the resin is achieved. Better adhesion of copper foil to a laminate core, such as defined in DIN 40802 for example, is achieved in the case of technical laminates, for example electrical laminates, and expressed as improved shear strength. Isochoric operation of the press is made possible by the entrained wire, that is to say the reaction zone has a specific height over the entire surface, including at the edges, whereby a close thickness tolerance for the material is possible. The edge cured without the application of any pressure which still has to be trimmed off after pressing, is confined to a few millimeters, so that reduced waste is attained.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE INVENTION

DETAILED DESCRIPTION OF THE INVENTION

Figure 1:
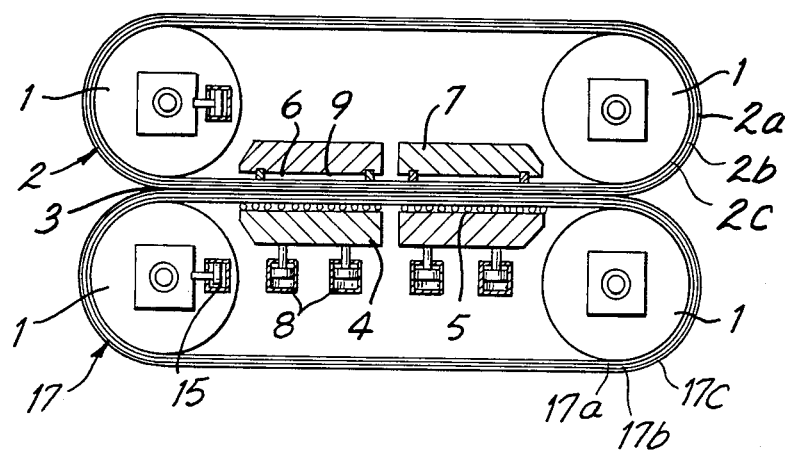
FIG. 1 shows a double band press in section in the longitidinal direction with two band sides.

The continuous-acting press shown in FIG. 1 comprises two multi-layered band sets, an upper set 2 and a lower set 17. Both band sets 2 and 17 travel over return rollers 1. Each multi-layered band set includes the individual press bands 2a, 2b, 2c or 17a, 17b, 17c, the stretched length of the press bands is determined so that the individual press bands can absorb uniformly the tensile and tangential forces necessary for the feed. Mechanical or hydraulic pressure is exerted by the pressure plates 4 and 7 through rolling-contact elements 5 or fluid pressure media 6 upon the mutually facing band surfaces 3 of the multi-layered band sets 2 and 17. The press frame, which absorbs the reactive forces emitted by the pressure-generating hydraulic cylinders 8 or by the fluid pressure medium 6 in the cavities 9, is not shown. The multi-layered band sets 2 and 17, as is known, are tensioned by tensioning means 15, hydraulic cylinders for example, and driven by the return rollers or drums 1.

Figure 2:
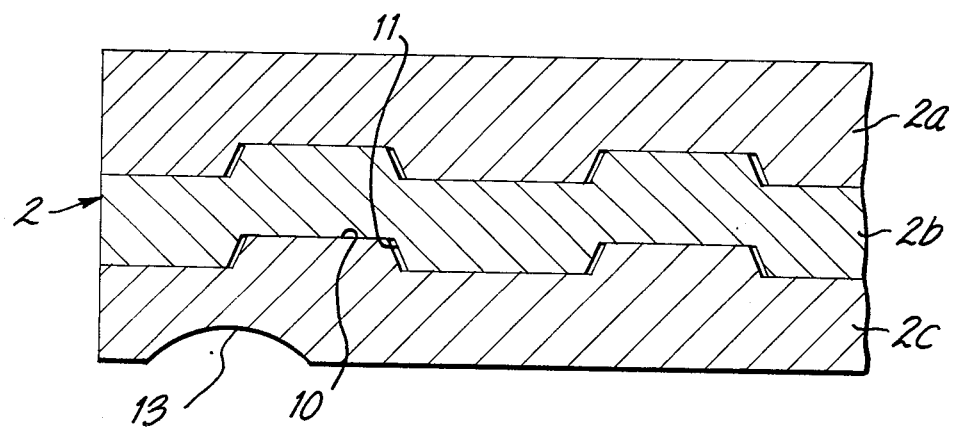
FIG. 2 shows a partial section of a multi-layered band set, viewed transversely to the travel section.

In order that the individual press bands 2a, 2b, 2c and 17a, 17b, 17c cannot wander or be displaced laterally due to misaligning forces acting at right angles to the travel direction of the multi-layered band sets, the individual press bands 2a, 2b, 2c, as shown in FIG. 2, have alternating lands 10 and grooves 11 which are worked into the press band and extend continuously along in the travel direction. The grooves 11 are engaged by the tooth-like land 10 on the facing surface of the press band located adjacent to the surface with the groove. The land is constructed as a positive relief counterpart of the groove and likewise extends along the total length of the band.

At least one groove 11 each on the left and right-hand sides of the band edges of the press bands, into which the corresponding tooth-like land 10 of the contacting band engages, is necessary for the lateral guidance. In order to reduce the stresses acting upon the individual lands 10, however, a plurality of such grooves 11 and lands 10 will advantageously be provided across the band width. A width of 3 mm may conveniently be selected for the grooves.

The grooves 11 and tooth-like lands 10 shown in FIG. 2 have a trapezoidal cross-section. However, any other cross-section which appears suitable may also be selected. With this arrangement no lateral displacement or wandering of the individual press bands can occur, whereas the required relative movement of the press bands in the travel direction is not influenced unfavorably. The large cross-sectional area of the tooth-like lands 10 prevents their destruction and achieves high precision in the lateral guidance of the individual press bands. Great operational reliability of the multi-layered band sets is thereby achieved.

Figure 3:
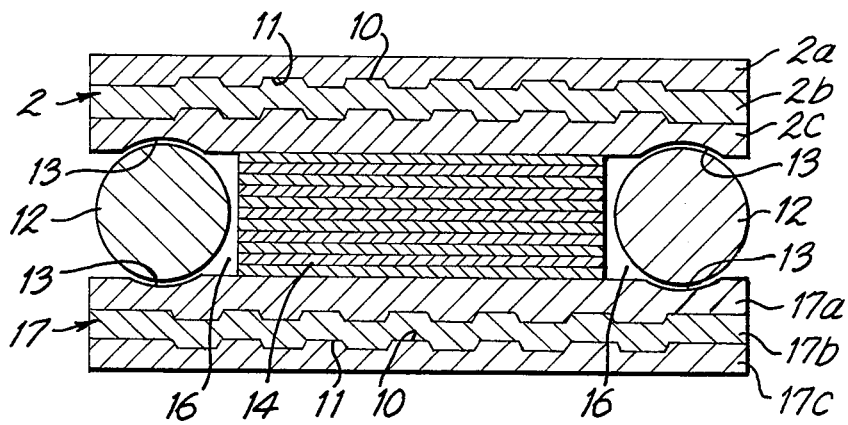
FIG. 3 shows, in a section transversely to the travel direction, the reaction zone formed by the insides of two press bands, with lateral limitation by an entrained wire.

FIG. 3 shows the reaction zone, which is formed by the mutually facing surfaces of the multi-layered band sets 2, 17. This reaction zone is sealed along each side by an entrained wire 12. The wire 12, which is drawn through the press at the same speed as the material 14, is seated within two oppositely disposed and facing grooves 13, which are formed in mutually facing surfaces 3 adjacent the edges of the press band 2c of the upper multi-layered band set 2 and press band 17a of the lower multi-layered band set 17 facing the material 14. The grooves 13 have the cross-section of a circular segment, prism or the like. The diameter of the wire corresponds exactly to the sum of twice the groove depth and the height of the laminate or material 14 between the mutually facing surfaces 3. The height of the reaction zone, including at the lateral sides, is thereby maintained constant and the continuous press permits isochoric operation. It is, therefore, possible to ensure an extraordinarily close thickness tolerance of the material 14. For example, thickness tolerances of only 5/100 mm are thereby made possible for electrical laminates.

A small cavity 16, in which the surplus resin escaping from the material 14 is collected, is located between the wire 12 and the material 14. The region of material cured without the application of pressure is thus restricted to a few millimeters, and only a very small amount of waste is produced at the edge.

The reaction zone, which is limited from above and below by the multi-layered band sets 2, 17, and along the sides by the entrained wires 12, forwardly as viewed in the feed direction of the press band by the cured resin, and rearwardly by the still unmolten resin, forms a closed space in which the process conditions can be adapted ideally to the material to be pressed and to the resin employed. Because, in contrast to the intermittent multi-daylight press, only one material pressing is produced, it is not necessary to select process conditions averaged over all the pressed products produced at one time. It is thereby possible to produce pressed products of higher quality, which is expressed, for example, by an up to 30% higher shear strength of the Cu foil of the laminate in the case of electrical laminates as compared to those produced by conventional methods.

I claim:

1. Continous-acting press comprising an upper and a lower multi-layered band set, a pair of return rollers for each said band set with each said band set guided over the corresponding pair of rollers, each said band set comprises a plurality of mutually contacting press bands in superposed arrangement, said upper and lower band sets being spaced apart and having mutually facing surfaces forming a space for receiving a material web therebetween such as laminate, chipboard, fiberboard, plywood, electrical laminate and the like arranged to be pressed as it passes between said mutually facing surfaces means for interengaging said materially contacting press bands, and means for sealing the laterally spaced edges of the space between the mutually facing surfaces of the upper and lower band sets which edges extend in the direction of travel of said bands over the corresponding said pair of rollers, wherein the improvement comprises that each of said press bands in each said band set has at least one first surface disposed generally parallel relative to said mutually facing surfaces and disposed in contact with another said first surface on another said press band, said means for interengaging comprises that each said first surface has alternating first grooves and lands therein extending continuously in the direction of travel of said band sets over said return rollers for the full length of said press bands, and said first grooves and lands of said contacting first surfaces being in meshed interengagement, said means for sealing comprises that each mutually facing surface of each said band set having said pair of laterally spaced edges has a second groove spaced inwardly from and extending in the same direction as each said edge so that each said groove in said mutually facing surface of said upper band set is positioned opposite one of said second grooves in said mutually facing surface of said lower band set, a wire seated within and extending between each of the oppositely disposed said second grooves in said mutually facing surfaces forming the space between said upper and lower band sets, and each said wire has a diameter equal approximately to the sum of the depths of said oppositely spaced second grooves inwardly from said mutually facing surface in which the second groove is formed and the space between said mutually facing surfaces of said upper and lower band sets.

2. Continuous-acting press, as set forth in claim 1, wherein said wire is drawn through the space between the mutually facing surfaces of said upper and lower band sets at the same speed at which the material web is fed therebetween.

3. Continuous-acting press, as set forth in claim 1, wherein said lands and said first grooves have cross-sectional shapes in closely fitting engagement with one another.

4. Continuous-acting press, as set forth in claim 1, wherein said second grooves of said mutually contacting surfaces of said band sets have similarly shaped cross-sections.

5. Continuous-acting press, as set forth in claim 4, wherein said second grooves have a circular segment-like shaped cross section.

6. Continuous-acting press, as set forth in claim 4, wherein said first grooves have a prism-shaped cross-section.

7. Continuous-acting press, as set forth in claim 4, wherein said first grooves have a trapezium shaped cross-section.

8. Continuous acting press, as set forth in claim 1, wherein said wires are spaced laterally outwardly from the material web to be moved through said space between the mutually facing surfaces of said upper and lower band sets for forming a cavity for receiving surplus resin pressed outwardly from the material web.

* * * * *